(12) United States Patent
Shemer et al.

(10) Patent No.: US 12,001,876 B2
(45) Date of Patent: Jun. 4, 2024

(54) DATA CENTER TIME TO VALUE

(71) Applicant: Dell Products, L.P., Round Rock, TX (US)

(72) Inventors: Jehuda Shemer, Kfar Saba (IL); Valerie Lotosh, Ramat-Gan (IL); Erez Sharvit, Ramat-Gan (IL)

(73) Assignee: DELL PRODUCTS L.P., Round Rock, TX (US)

( * ) Notice: Subject to any disclaimer, the term of this patent is extended or adjusted under 35 U.S.C. 154(b) by 438 days.

(21) Appl. No.: 17/508,591

(22) Filed: Oct. 22, 2021

(65) Prior Publication Data

US 2023/0131050 A1   Apr. 27, 2023

(51) Int. Cl.
G06F 9/44       (2018.01)
G06F 9/455      (2018.01)
G06F 9/50       (2006.01)

(52) U.S. Cl.
CPC ........ *G06F 9/45558* (2013.01); *G06F 9/5022* (2013.01); *G06F 9/5077* (2013.01); *G06F 2009/4557* (2013.01); *G06F 2009/45579* (2013.01); *G06F 2009/45595* (2013.01); *G06F 2209/505* (2013.01)

(58) Field of Classification Search
CPC .................................................. G06F 9/45558
USPC .......................................................... 718/104
See application file for complete search history.

(56) References Cited

U.S. PATENT DOCUMENTS

| 2016/0350143 | A1* | 12/2016 | Uliel | G06F 9/45558 |
| 2016/0379237 | A1* | 12/2016 | Shapsa | G06Q 30/0206 |
| | | | | 705/7.35 |
| 2017/0255890 | A1* | 9/2017 | Palavalli | G06Q 10/06 |
| 2023/0125085 | A1 | 4/2023 | Shemer et al. | |

\* cited by examiner

*Primary Examiner* — Timothy A Mudrick
(74) *Attorney, Agent, or Firm* — Amin, Turocy & Watson, LLP

(57) ABSTRACT

A system can receive an order to install a first data center on customer premises, wherein the first data center comprises a first instance of a virtualized overlay network and a first instance of virtualized volume identifiers. The system can, in response to determining that installing the first data center is threshold likely to take at least a defined amount of time to install, instantiate a second data center for the customer account at a colocation site, wherein the second data center comprises a second instance of the virtualized overlay network a second instance of the virtualized volume identifiers. The system can operate customer workloads using the second data center. The system can, after instantiating the second data center, and in response to determining that the first data center is operational, switch the operating of the customer workloads from the second data center to the first data center.

20 Claims, 11 Drawing Sheets

900

(902)

RECEIVING ORDER DATA REPRESENTATIVE OF AN ORDER FROM A CUSTOMER ACCOUNT TO INSTALL AND MANAGE A FIRST DATA CENTER AT A FIRST PHYSICAL LOCATION, WHEREIN THE FIRST DATA CENTER COMPRISES A FIRST INSTANCE OF A VIRTUALIZED OVERLAY NETWORK THAT ABSTRACTS PHYSICAL NETWORK RESOURCES AND A FIRST INSTANCE OF A GROUP OF VIRTUALIZED VOLUME IDENTIFIERS THAT ABSTRACT PHYSICAL STORAGE VOLUMES 904

IN RESPONSE TO RECEIVING THE ORDER DATA, AND IN RESPONSE TO DETERMINING THAT THERE WILL BE AT LEAST A THRESHOLD DELAY ASSOCIATED WITH INSTALLING THE FIRST DATA CENTER, INSTANTIATING A SECOND DATA CENTER FOR THE CUSTOMER ACCOUNT AT SECOND PHYSICAL LOCATION, WHEREIN THE SECOND DATA CENTER COMPRISES A SECOND INSTANCE OF THE VIRTUALIZED OVERLAY NETWORK A SECOND INSTANCE OF THE GROUP OF VIRTUALIZED VOLUME IDENTIFIERS 906

OPERATING CUSTOMER WORKLOADS USING THE SECOND DATA CENTER, WHEREIN THE CUSTOMER WORKLOADS INVOKE THE SECOND INSTANCE OF THE VIRTUALIZED OVERLAY NETWORK AND THE SECOND INSTANCE OF THE GROUP OF VIRTUALIZED VOLUME IDENTIFIERS 908

AFTER INSTANTIATING THE SECOND DATA CENTER, AND IN RESPONSE TO DETERMINING THAT THE FIRST DATA CENTER IS OPERATIONAL, SWITCHING THE OPERATING OF THE CUSTOMER WORKLOADS FROM THE SECOND DATA CENTER TO THE FIRST DATA CENTER, WHEREIN THE CUSTOMER WORKLOADS INVOKE THE FIRST INSTANCE OF THE VIRTUALIZED OVERLAY NETWORK AND THE FIRST INSTANCE OF THE GROUP OF VIRTUALIZED VOLUME IDENTIFIERS 910

DATA CENTER TIME TO VALUE

BACKGROUND

A data center can comprise a plurality of computers that are configured to store and/or operate on data. Managing a data center can comprise various operations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. A system can receive an order from a customer account to install and manage a first data center on customer premises, wherein the first data center comprises a first instance of a virtualized overlay network that virtualizes physical network resources and a first instance of a group of virtualized volume identifiers that virtualize physical storage volumes. The system can, in response to receiving the order, and in response to determining that installing the first data center is threshold likely to take at least a defined amount of time to install, instantiate a second data center for the customer account at a colocation site, wherein the second data center comprises a second instance of the virtualized overlay network a second instance of the group of virtualized volume identifiers. The system can operate customer workloads using the second data center, wherein the customer workloads invoke the second instance of the virtualized overlay network and the second instance of the group of virtualized volume identifiers. The system can, after instantiating the second data center, and in response to determining that the first data center is operational, switch the operating of the customer workloads from the second data center to the first data center, wherein the customer workloads invoke the first instance of the virtualized overlay network and the first instance of the group of virtualized volume identifiers.

An example method can comprise receiving, by a system comprising a processor, order data representative of an order from a customer account to install and manage a first data center at a first physical location, wherein the first data center comprises a first instance of a virtualized overlay network that abstracts physical network resources and a first instance of a group of virtualized volume identifiers that abstract physical storage volumes. The method can further comprise, in response to receiving the order data, and in response to determining that there will be at least a threshold delay associated with installing the first data center, instantiating, by the system, a second data center for the customer account at second physical location, wherein the second data center comprises a second instance of the virtualized overlay network a second instance of the group of virtualized volume identifiers. The method can further comprise operating, by the system, customer workloads using the second data center, wherein the customer workloads invoke the second instance of the virtualized overlay network and the second instance of the group of virtualized volume identifiers. The method can further comprise, after instantiating the second data center, and in response to determining that the first data center is operational, switching, by the system, the operating of the customer workloads from the second data center to the first data center, wherein the customer workloads invoke the first instance of the virtualized overlay network and the first instance of the group of virtualized volume identifiers.

An example non-transitory computer-readable medium can comprise instructions that, in response to execution, cause a system comprising a processor to perform operations. These operations can comprise, in response to determining to instantiate a first data center at a first physical location for a customer account, wherein the first data center comprises a first overlay network that presents an overlay and a first storage virtualization that presents virtual storage, instantiating a second data center for the customer account at second physical location, wherein the second data center comprises a second overlay network that presents the overlay and a second storage virtualization that presents the virtual storage. These operations can further comprise operating customer workloads on the second data center, wherein the customer workloads invoke the second overlay network and the second storage virtualization. These operations can further comprise, after instantiating the second data center, and in response to determining that the first data center is operational, switching the operating of the customer workloads from the second data center to the first data center, wherein the customer workloads invoke the first overlay network and the first storage virtualization.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates another example process flow for data center time to value, in accordance with an embodiment of this disclosure;

DETAILED DESCRIPTION

Example Architectures

Figure 1:
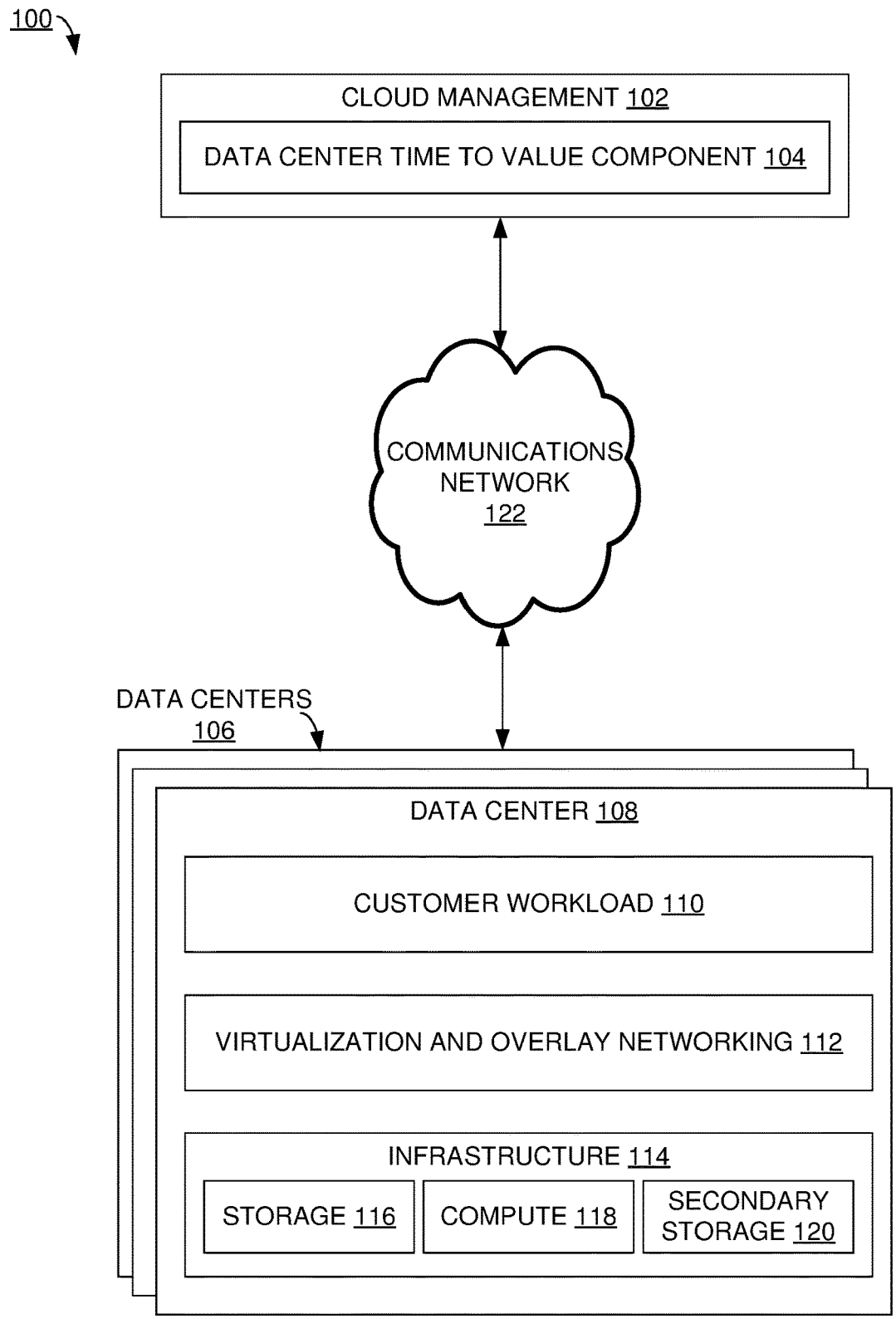
FIG. 1 illustrates an example system architecture that can facilitate data center time to value, in accordance with an embodiment of this disclosure.

FIG. 1 illustrates an example system architecture 100 that can facilitate data center time to value, in accordance with an embodiment of this disclosure.

System architecture 100 can facilitate deployment and management of infrastructure at customer premise or hosted locations. System architecture 100 can facilitate consuming infrastructure as a service. System architecture 100 generally targets full data center deployments (e.g., data centers 106, in an architecture that can be referred to as data centers as a service (DCaaS)). System architecture 100 can comprise data centers that run virtual infrastructure (e.g., customer workload 110 operating on top of virtualization and overlay networking 112) and can facilitate data protection and mobility use of those data centers.

A data center (e.g., data center 108) in system architecture 100 can comprise compute (e.g., compute 118), storage (e.g., storage 116), and networking, and which has a virtualization layer (e.g., virtualization and overlay networking 112). That is, system architecture 100 can deploy a data center that can run infrastructure as a service (IaaS) workloads. Where system architecture 100 deploys infrastructure as a service, this can be referred to as IaaS as a service (IaaSaaS).

System architecture 100 can differ from other cloud offerings. Some other cloud offerings support creating extensions of themselves, which can be hosted in other locations. In the example of system architecture 100, cloud management 102 can be used to orchestrate and manage a completely independent customer data center (e.g., data center 108). The manner in which technologies are used, and the way that layers (e.g., infrastructure 114 and virtualization and overlay networking 112) can be decomposed in system architecture 100 can differ from that of other cloud offerings.

That is, in other cloud offerings, such as public clouds (where workloads for multiple customers are run on the same hardware and/or in the same data center), hardware resources can generally be shared between tenants (e.g., customers). This can lead to security concerns because one customer can be sharing hardware with a rival entity (e.g., two competing consumer packaged goods companies) or a malicious actor. A security hole or data leak can cause immediate damage. In contrast, with system architecture 100, a small deployment can be created that is dedicated to a customer and data can be stored on customer premises or stored in a dedicated area for the customer.

In other cloud offerings, management can be optimized for a small number of large hardware locations. Other cloud offerings can rely on uniformity and consistency of hardware and access in order to optimize their maintenance. In contrast, system architecture 100 can be used to manage a larger number of customer locations, each with a relatively small deployment. With system architecture 100, there can be differences in hardware between customer locations according to an age and/or version of deployment, or according to a price or service level agreement designation. The management issues associated with these two types of architectures can be different.

Cloud extensions can be additional hardware from a same cloud region located in a different physical place. In system architecture 100, each location can be a separate instance, which can be connected and/or extended by utilizing the present techniques.

System architecture 100 can be utilized to connect to existing customer data center components, whereas with other cloud offerings this can constitute a security violation.

System architecture 100 can be implemented to deploy or utilize hardware of a wide range of profiles and capabilities. This hardware can include one or more servers (e.g., compute 118) with a central processing unit, memory, local storage, and peripheral devices; one or more primary storage systems (e.g., storage 116, where primary storage can generally be optimized for performance (e.g., provide a low latency for reads and writes), and be used for running an organization's main applications and workloads); network switches and devices (e.g., network and/or a storage area network (SAN); and/or additional hardware for secondary storages (e.g., secondary storage 120, where, in contrast to primary storage, secondary storage can generally be optimized for long term reliability and capacity, and used for backup and data protection systems) or other services. This hardware can also include object storage, file systems, network attached storage (NAS), hardware for performance acceleration (e.g., graphics processing units (GPUs), cache cards, central processing unit (CPU) offload cards, smart network interface cards (NICs), etc.), and/or specialized servers or other hardware for specific purposes like stream servers, messaging, artificial intelligence (AI), image processing and/or security.

In some examples, this hardware can be configured and wired by an entity that manages cloud management 102, and on behalf of a customer that possesses data center 108. The hardware can be delivered to data center 108, or can be hosted by the entity that manages cloud management 102, or by a third party. In some examples, in hosting sites, general hardware can already be available at the time of a customer order, and be allocated to a customer upon a service request.

In addition to hardware, multiple software components can be deployed and managed in accordance with customer requests.

Cloud management 102 can comprise a cloud portal that provides a purchasing and management user interface, and that facilitates ordering hardware resources; managing resource usage; monitoring and error handling; and upgrade and life cycle.

Cloud management 102 can store customer-related information and details pertaining to customer infrastructure (e.g., an architecture of data center 108).

In system architecture 100, deployed infrastructure (e.g., deployed infrastructure of data center 108) can be managed by cloud management 102, and in some examples, a customer can be billed according to the resources that the customer utilizes (which can be referred to as, pay as you go). In such examples, the customer can avoid allocating an information technology (IT) team to manage the infrastructure.

In some examples, system architecture 100 involves deploying a full data center (e.g., data center 108), where the data center is entirely managed by cloud management 102, and where the data center is targeted for a virtualized workload.

That is, system architecture 100 can involve a DCaaS where the data center is under cloud management 102 management (e.g., the customer does not provide infrastructure). Virtualized infrastructure (e.g., virtualization and overlay networking 112) can comprise a hypervisor on which the customer allocates virtual workloads (e.g., customer workload 110), which can be an IaaS implementation. That is, a full IaaS data center can be deployed as a service, and referred to as IaaSaaS.

Given those considerations, system architecture 100 can deploy an IaaS data center as a service. System architecture 100 can target a data center that is optimized for virtualized workloads on customer premises or a hosting facility. The customer can provide high-level resource definitions (e.g., intent-based provisioning) and service level agreements (SLAs) for a data center to cloud management 102. From this information, cloud management 102 can derive a data center hardware definition. Hardware corresponding to this hardware definition can be shipped to customer premise, or shipped to or allocated on a hosting site. When the hardware is shipped and ready, cloud management 102 can configure the hardware and networking, and then deploy and configure a virtualization stack on the hardware. In some examples, the hardware can be shipped, wired, deployed, and then configured. In other examples, the hardware can be pre-wired, pre-deployed, pre-configured, and then shipped. For example, one or more racks of hardware can be wired and connected, have a stack deployed on the hardware, and then the racks of hardware can be shipped. Once the racks of hardware are received at a destination, they can be connected to power and an external network and begin operations.

A data center can comprise storage (e.g., storage 116). A data center can also comprise compute (e.g., compute 118), which can comprise servers that lack (or do not utilize) local storage and are configured to boot from and store their data to storage 116. Booting can be implemented via technologies such as a preboot execution environment (PXE) book, or a network boot. The devices that the compute boots from can be configured by cloud management 102 as part of hardware and networking configuration. A data center can also comprise secondary storage (e.g., secondary storage 120). In some examples, there can be multiple instances of each of these components, and multiple different hardware models of each component can be deployed within a data center.

In some examples, local storage can be omitted from compute servers to facilitate maintenance. In such a system architecture, server hardware can be added or replaced and booted from the storage, without maintaining data on the server itself. Additionally, using a common boot device for virtual infrastructure can facilitate easier upgrades and configuration. Then, data protection can be facilitated by using such a system architecture.

Virtualization and overlay networking 112 can comprise the following to support data protection and mobility use cases. Virtualization and overlay networking 112 can comprise virtualized overlay networking (which virtualizes underlying network resources to components that operate on top of the virtual overlay network), and storage that is configured to spoof or virtualize volume identifiers (such as world wide names (WWNs)).

Where cloud management 102 manages the deployment and configuration of a data center, cloud management 102 can have information about the data center and the customer that cloud management 102 can use to manage the data center. This information can include customer infrastructure services information; ordered, deployed, and in-use resources; a customer's physical location; and customer SLAs.

System architecture 100 comprises cloud management 102, data centers 106, and communications network 122.

In turn, cloud management 102 comprises data center time to value component 104. Data centers 106 comprises a plurality of data centers, including data center 108. Data center 108 comprises customer workload 110, virtualization and overlay networking 112, and infrastructure 114. Infrastructure 114 comprises storage 116, compute 118, and secondary storage 120.

Figure 11:
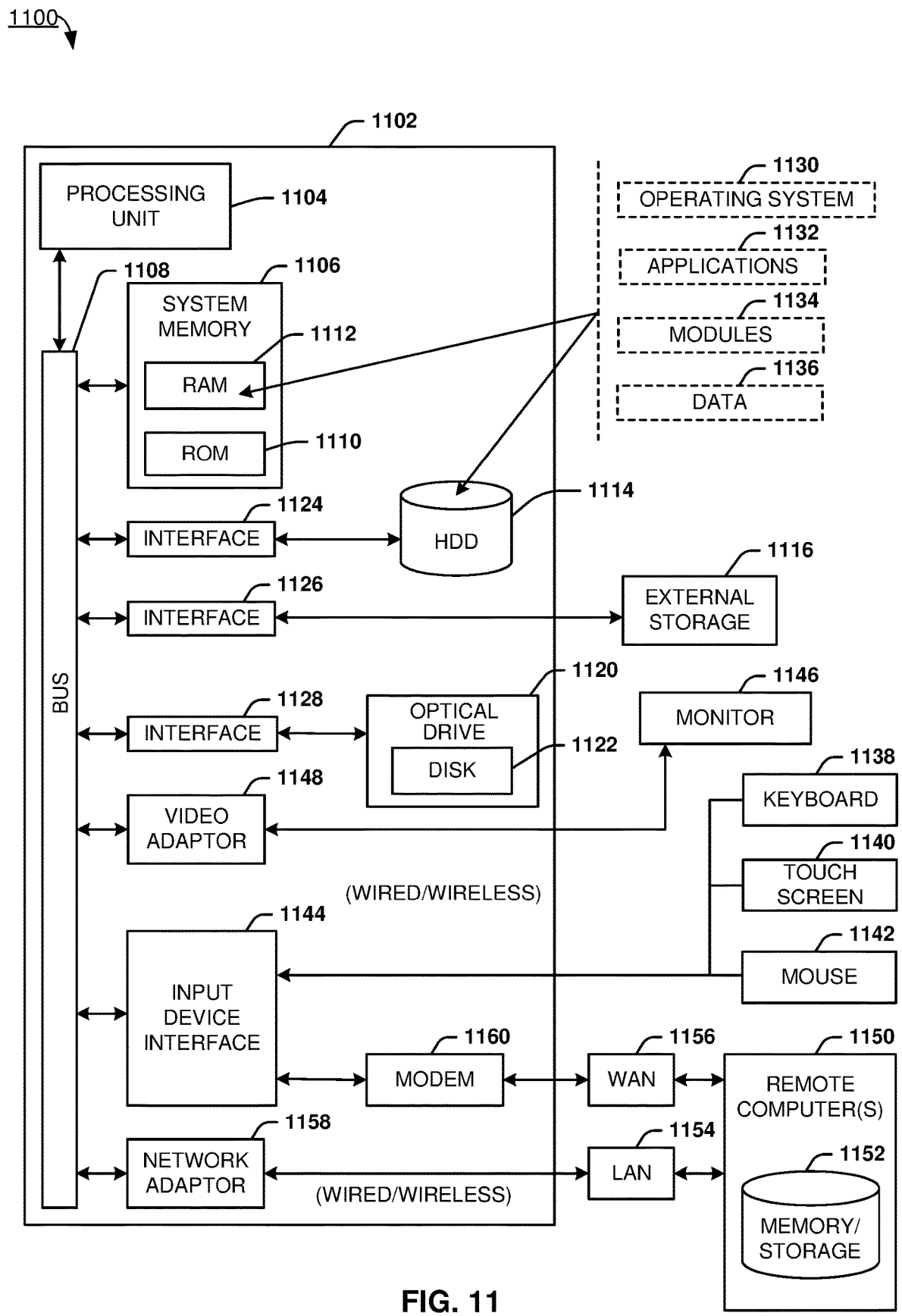
FIG. 11 illustrates an example block diagram of a computer operable to execute an embodiment of this disclosure.

Each of cloud management 102, data centers 106, and data center 108 can be implemented with part(s) of computing environment 1100 of FIG. 11. Communications network 122 can comprise a computer communications network, such as the INTERNET.

Cloud management 102 can communicate with data centers 106 and data center 108 via communications network 122 to manage data centers 106 and data center 108. In managing a data center, cloud management 102 can perform functions such as provisioning and managing virtualization and overlay networking 112, and infrastructure 114, and running customer workload 110 on data center 108.

Data center time to value component 104 of cloud management 102 can facilitate installing a new data center. When a customer orders a new data center (e.g., data center 108) installed on premises, while that installation occurs, data center time to value component 104 can instantiate a hosted data center for the customer (e.g., as part of colocation site 514 of FIG. 5), and run the customer's workloads on the hosted data center. When the ordered data center is ready, data center time to value component 104 can switch running the customer workloads from the hosted data center to the on-premises data center.

By running customer workloads on a hosted data center while installing the new data center, data center time to value component 104 can reduce a time to value for the customer between when the customer places the order and when the customer's workloads begin to operate. In effectuating data center time to value, data center time to value component 104 can implement part(s) of the operating procedures of FIGS. 8-10.

In addition to facilitating installing a new data center, data center time to value component 104 can facilitate other examples. For example, data center time to value component 104 can facilitate examples of adding hardware to an existing data center, re-evaluating hardware, and workload provisioning.

Regarding adding hardware to an existing data center, an order can be for additional hardware to a pre-existing data center (e.g., more servers). In this case, the data center can be established, but it will take time for the additional servers to be shipped and installed. In such a case, data center time to value component 104 can temporarily utilize hardware at another location (e.g., a colocation site) to run customer workloads while the additional hardware is shipped. This temporarily utilized data center can be decommissioned once the additional new hardware reaches the data center and workloads are migrated to it.

Regarding workload provisioning, in an example, a customer can wish to deploy a workload as a service. For example, a customer can want cloud management 102 to create a database cluster. Cloud management 102 can determine that there is not sufficient hardware resources at the customer's site for the database cluster, so can create a workload associated with the database cluster at a colocation site (allowing the customer to start working on the workload), ship the needed hardware to the customer site in parallel, and migrate the customer workload to the customer site once the new hardware is ready. A trigger for additional hardware in a workload provisioning example can be cloud management 102 deriving the need for additional hardware from customer workload needs.

Customer workload 110 can comprise workloads provided by a customer of data center 108 that operate on data center 108. Customer workload 110 can comprise a virtualized workload—e.g., a virtual machine on which customer components operate, and where the virtual machine operates on top of virtualization and overlay networking 112.

Virtualization and overlay networking 112 can comprise virtualization management component (e.g., a hypervisor) that supports the execution of customer workload 110. Virtualization and overlay networking 112 can also comprise storage virtualization. In some examples, the virtualization management can comprise management for virtual machine-based virtualization, for container-based virtualization, for other types of virtualization, or for a combination of types of virtualization.

Infrastructure 114 can comprise computer hardware of data center 108. Storage 116 can comprise storage devices upon which computer data can be stored. Compute 118 can comprise one or more servers that process data stored on storage 116. In some examples, compute 118 omits using its own local storage, and instead uses storage 116 for storage. This separation of compute and storage hardware can facilitate managing a data center, as well as restoring a data center. Secondary storage 120 can be similar hardware to storage 116. Where storage 116 is used by compute 118, secondary storage can be used for backup and staging of data, such as to store a snapshot of storage 116, or to store data send from cloud management 102 in the course of managing data center 108.

Figure 2:
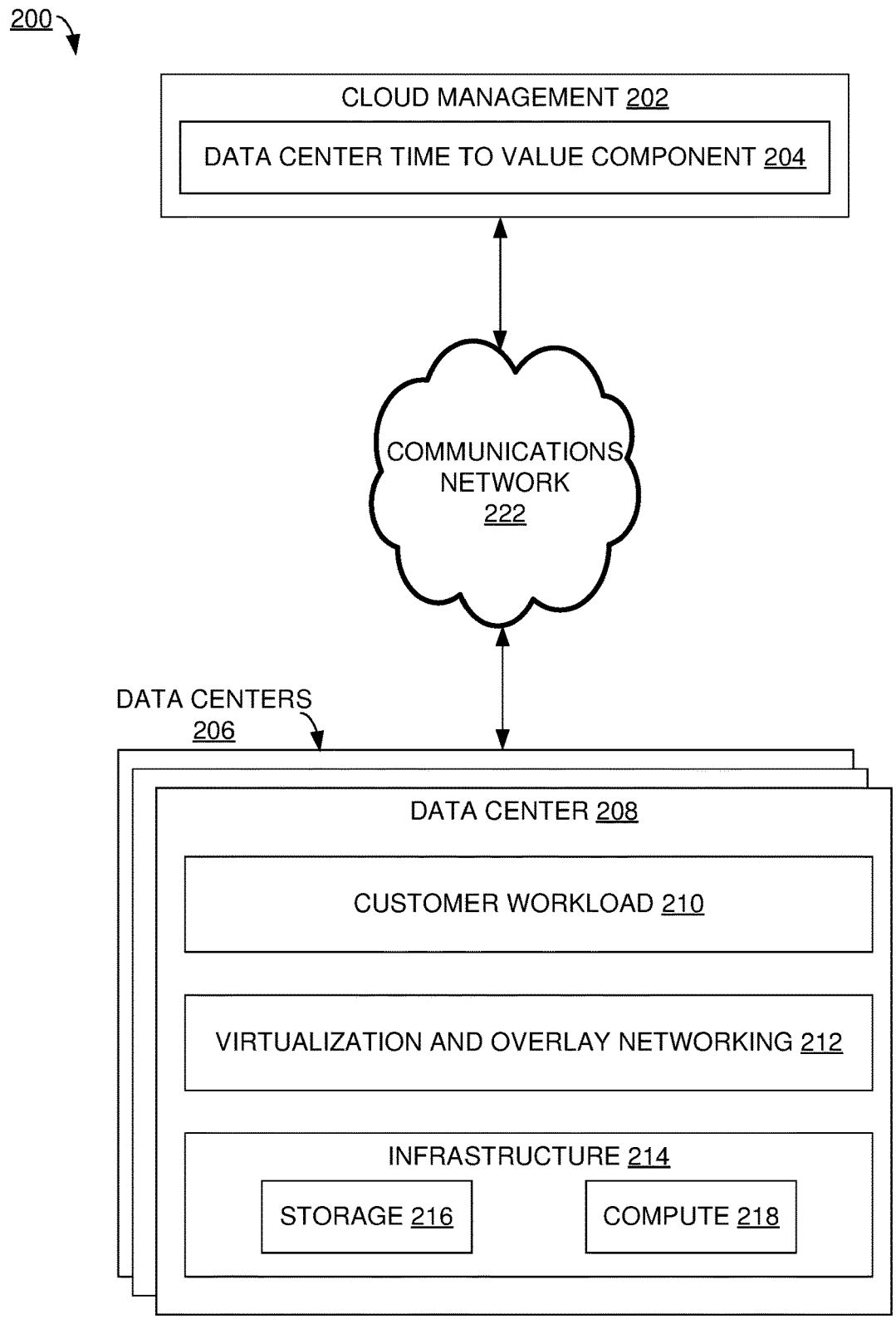
FIG. 2 illustrates another example system architecture that can facilitate data center time to value, in accordance with an embodiment of this disclosure.

FIG. 2 illustrates another example system architecture 200 that can facilitate data center time to value, in accordance with an embodiment of this disclosure.

System architecture 200 comprises cloud management 202, data centers 206, and communications network 222 (which can be similar to cloud management 102, data centers 106, and communications network 122 of FIG. 1, respectively).

In turn, cloud management 202 comprises data center time to value component 104 (which can be similar to data center time to value component 104). Data centers 206 comprises a plurality of data centers, including data center 208 (which can be similar to data center 108). Data center 208 comprises customer workload 210, virtualization and overlay networking 212, and infrastructure 214 (which can be similar to customer workload 110, virtualization and overlay networking 112, and infrastructure 114, respectively). Infrastructure 214 comprises storage 216 and compute 218 (which can be similar to storage 116 and compute 118, respectively).

A difference between system architecture 200 and system architecture 100 can be that system architecture 200 lacks secondary storage in data center 208 while system architecture 100 has secondary storage 120 in data center 108. Despite this difference, system architecture 200 and system architecture 100 can still each be implemented to facilitate data center restoration.

Figure 3:
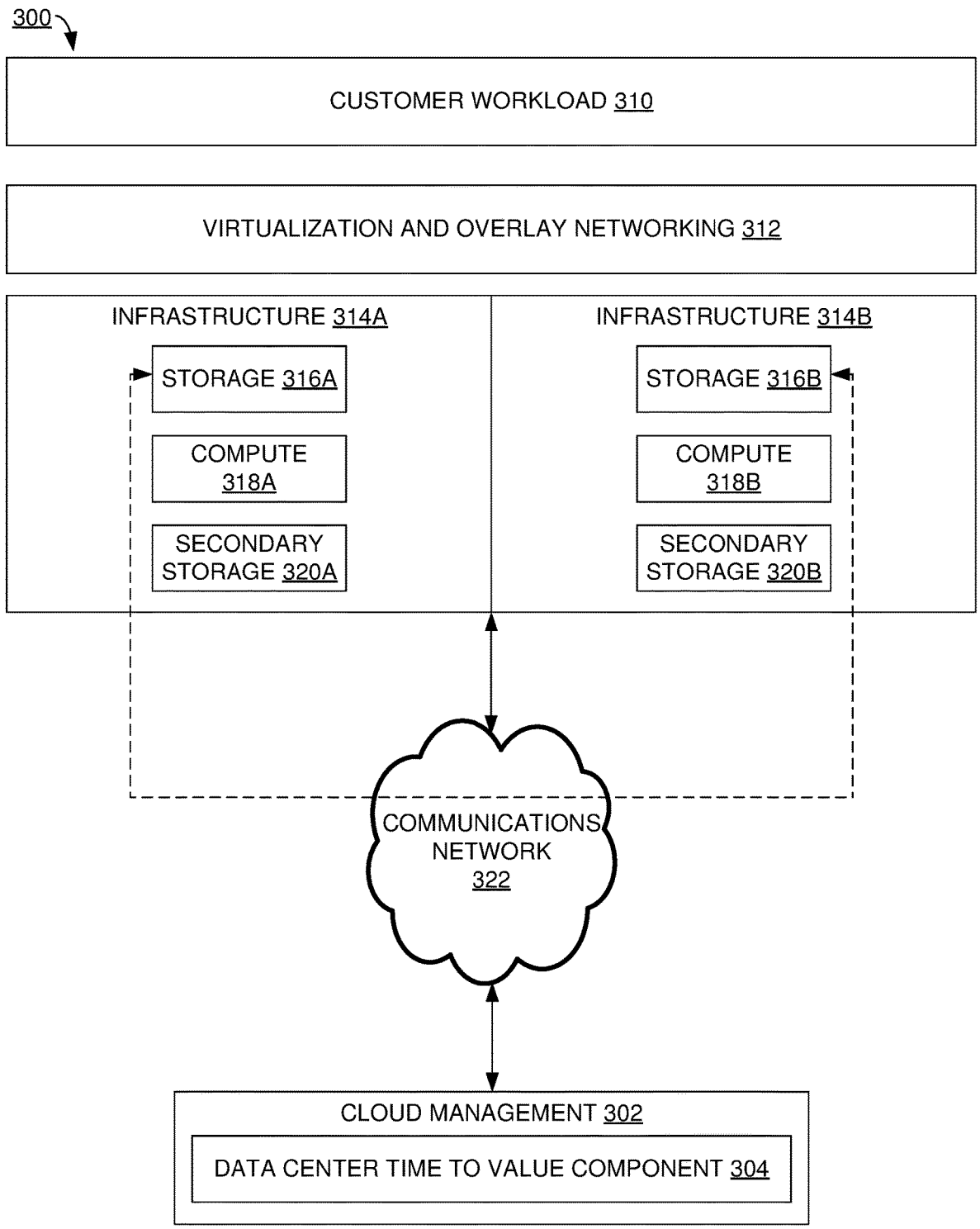
FIG. 3 illustrates another example system architecture that can facilitate data center time to value, in accordance with an embodiment of this disclosure.

FIG. 3 illustrates another example system architecture 300 that can facilitate data center time to value, in accordance with an embodiment of this disclosure.

System architecture 300 comprises cloud management 302, customer workload 310, virtualization and overlay networking 312, infrastructure 314A, infrastructure 314B, and communications network 322 (which can be similar to cloud management 102, customer workload 110, virtualization and overlay networking 112, infrastructure 114, another instance of infrastructure 114, and communications network 122 of FIG. 1, respectively).

In turn, cloud management 302 comprises data center time to value component 304 (which can be similar to data center time to value component 104). Customer workload 310 and virtualization and overlay networking 312 can be similar to customer workload 110 and virtualization and overlay networking 112, respectively.

Infrastructure 314A comprises storage 316A, compute 318A, and secondary storage 320A (which can be similar to storage 116, compute 118, and secondary storage 120, respectively). Infrastructure 314B comprises storage 316B, compute 318B, and secondary storage 320B (which can be similar to storage 116, compute 118, and secondary storage 120, respectively).

Using storage mirroring (e.g., mirroring of storage 316A and storage 316B), networking technology (such as virtualization and overlay networking 312), and with active compute (e.g., compute 318A and compute 318B), on both locations of a distributed data center (e.g., infrastructure 314A and infrastructure 314B), a distributed data center can automatically be created. Each component data center of a distributed data center can have active compute and workloads, and workloads can be run freely on both locations.

Storage 316A and storage 316B can be configured in a mirroring configuration, where writes written to one storage are immediately and inline mirrored to the other. This configuration can mean that data in storage 316A and storage 316B can be identical (or mirrored). In some examples, technologies such as redundant array of inexpensive disks (RAID) 1, synchronous storage replicas, distributed storage volumes, synchronous clones, and active-active storage volumes can be used to implement mirroring between storage 316A and storage 316B.

While the example of system architecture 300 (and system architecture 400 of FIG. 4) illustrates two data centers in a distributed data center, it can be appreciated that there can be distributed data centers made up of more than two data centers. In some examples, component data centers in a distributed data center (e.g., infrastructure 314A and infrastructure 314B) can be referred to as "data center locations," to distinguish these component data centers from the collected distributed data center.

A distributed data center as in system architecture 300 can be used for data center expansion beyond the physical limits of a data center facility. One data center location can run out of floor space, reach electricity load limits, or air conditioning limits, and so additional expansion is to happen at a different location.

In some examples, the data center locations in a distributed data center are not identical in terms of hardware capabilities, but are managed and exposed to users as one unified data center.

In some examples, cloud management 302 can communicate with virtualization management of virtualization and overlay networking 312 to create affinity between workloads, to designate coupled workloads to run at a same data center location. This approach of affinity between workloads can increase runtime efficiency.

In some examples, a distributed data center architecture can be distinguished from an availability zone architecture.

In some examples, an availability zone architecture is active/passive between zones, whereas multiple data center locations of a distributed data center are active concurrently.

In some examples, an availability zone architecture involves nearly-identical data centers (where a passive data center is to handle all workloads being processed by an active data center), whereas data center locations in a distributed data center can be more heterogenous. An availability zone architecture can require identical storage in both locations, whereas it can be that a distributed architecture does not require this. An availability zone architecture can implement a high availability mechanism to orchestrate a failover between data centers for a workload to migrate, and this can be omitted in a distributed data center architecture. In some examples, an availability zone architecture involves separate power and infrastructure to make the availability zones separately available where one fails, and there can be examples of distributed data center architectures where this is neither required nor needed.

Figure 4:
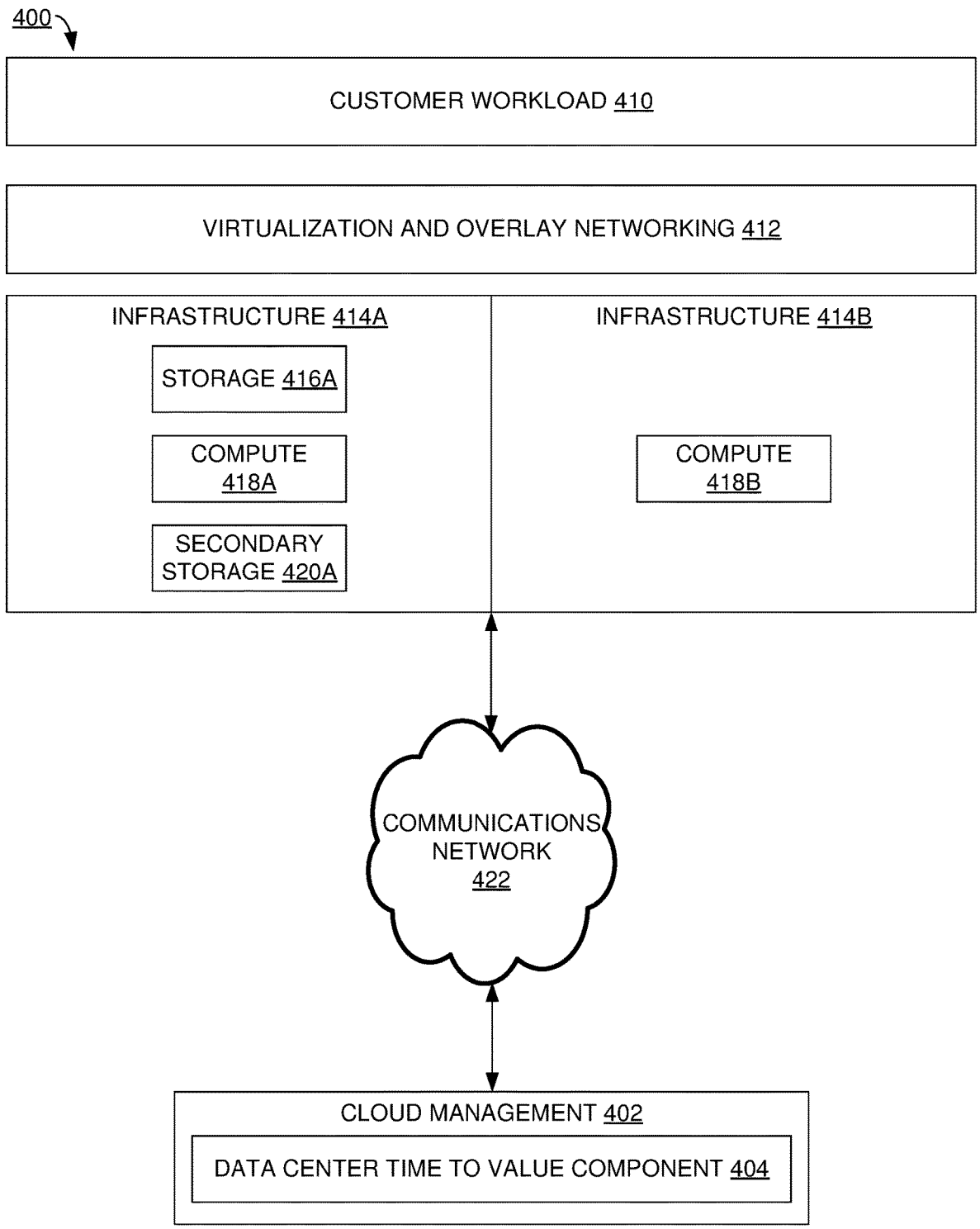
FIG. 4 illustrates another example system architecture that can facilitate data center time to value, in accordance with an embodiment of this disclosure.

FIG. 4 illustrates another example system architecture 400 that can facilitate data center time to value, in accordance with an embodiment of this disclosure.

System architecture 400 comprises cloud management 402, customer workload 410, virtualization and overlay networking 412, infrastructure 414A, infrastructure 414B, and communications network 422 (which can be similar to cloud management 102, customer workload 110, virtualization and overlay networking 112, infrastructure 114, another instance of infrastructure 114, and communications network 122 of FIG. 1, respectively).

In turn, cloud management 402 comprises data center time to value component 404 (which can be similar to data center time to value component 104). Customer workload 410 and virtualization and overlay networking 412 can be similar to customer workload 110 and virtualization and overlay networking 112, respectively.

Infrastructure 414A comprises storage 416A, compute 418A, and secondary storage 420A (which can be similar to storage 116, compute 118, and secondary storage 120, respectively). Infrastructure 414B comprises compute 418B (which can be similar to compute 118). A difference between system architecture 400 and system architecture 300 of FIG. 3 is that system architecture 400 depicts a distributed storage system where some infrastructure (infrastructure 414B) omits storage. In some examples, a distributed data center can comprise at least two physical data center locations that have other hardware differences, such as differences in compute, secondary storage, object storage, file systems, NASes, hardware for performance acceleration, and specialized servers or hardware for specific purposes.

In such examples, storage 416A can be used for storage for the distributed data center, and both compute 418A of infrastructure 414A and compute 418B of infrastructure 414B can operate on data that is stored in storage 416A.

Figure 5:
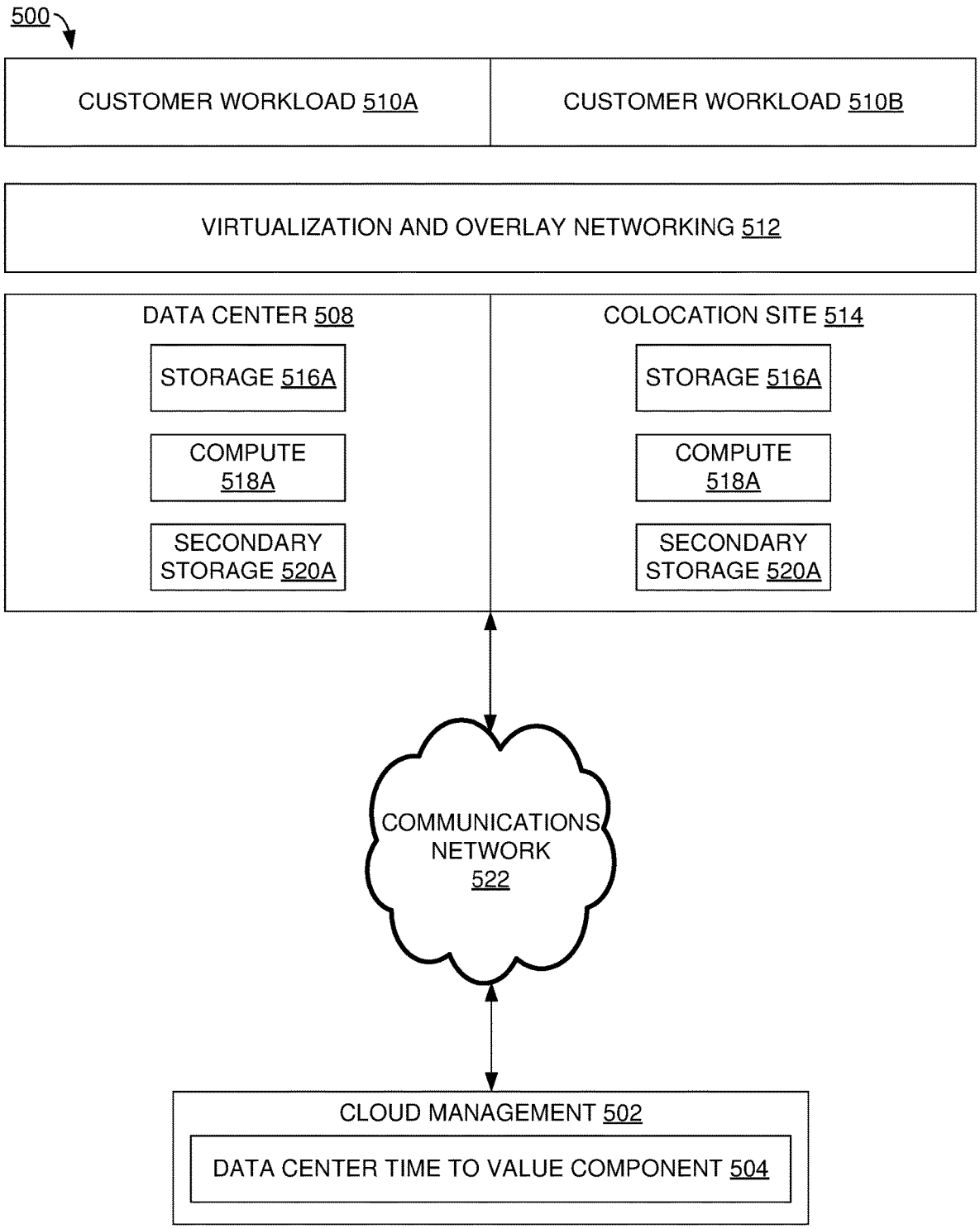
FIG. 5 illustrates another example system architecture that can facilitate data center time to value, in accordance with an embodiment of this disclosure.

FIG. 5 illustrates another example system architecture 500 that can facilitate data center time to value, in accordance with an embodiment of this disclosure. System architecture 500 comprises cloud management 502, data center 508, customer workload 510, virtualization and overlay networking 512, colocation site 514, and communications network 522 (which can be similar to cloud management 102, data center 108, customer workload 110, virtualization and overlay networking 112, one of data centers 106, and communications network 122 of FIG. 1, respectively).

In turn, cloud management 502 comprises data center time to value component 504 (which can be similar to data center time to value component 104). Customer workload 510 and virtualization and overlay networking 512 can be similar to customer workload 110 and virtualization and overlay networking 112, respectively.

Data center 508 comprises storage 516A, compute 518A, and secondary storage 520A (which can be similar to storage 116, compute 118, and secondary storage 120, respectively).

A colocation site (sometimes referred to as a hosted site) can generally comprise a physical data center location that is separate from a customer's physical data location, that is managed and/or owned by an entity other than the customer, and that is configured to operate workloads for multiple customers. A colocation site can differ from an on-premises data center (e.g., data center 508) in that an on-premises data center can be owned and/or controlled by one customer and used to operate that one customer's workloads.

Colocation site 514 comprises storage 516B, compute 518B, and secondary storage 520B (which can be similar to storage 116, compute 118, and secondary storage 120, respectively).

In some examples, there can be a delay between a time when a customer orders hardware resources until a time when the hardware is shipped to the customer's premises and configured to create data center 508. This time delay can be referred to as a time to value (TTV). A time involved with an order can comprise a time to fulfill an order, a time to physically ship the hardware, and a time to install the hardware. Furthermore, the customer's premises can have a physical issue (e.g., a problem with its floor, electricity, or air conditioning) that can add additional time to TTV.

The present techniques can be applied to lowering TTV while also permitting a customer to run its workloads in an on premises once the on premises order has been fulfilled.

In some examples, a customer can order a data center to be installed on customer premises by communicating with cloud management 502. Cloud management 502 can create a data center on a colocation site (or data center separate from the customer premises, e.g., colocation site 514), using the same (or compatible) storage (e.g., storage 516B) as storage (e.g., storage 516A) that is targeted for the customer order, and run customer workloads (e.g., customer workload 510B) on this off-premises data center.

Compatible storage can be storage that meats at least a service level requests by a customer (e.g., with respect to access speed, compatible storage can be storage that is faster than that which is requested by the customer. A customer can request a data center with a certain service level (which can be stated by the customer, or derived from a SLA, or performance or service requirements). In this context, "the same storage" can be storage that meets these requirements, and "compatible storage" can be storage that exceeds these requirements.

In some examples, it can be determined to use compatible storage where the storage will be temporarily used for a particular customer (e.g., it will be decommissioned after a customer data center is instantiated and a customer workload is moved to the customer data center). In such a case, there can be minimal waste from using higher performant storage than is required.

The hardware for the customer data center (e.g., data center 508) can be shipped to the customer premises, installed, and configured. Once the hardware is installed and configured on premises, the customer workloads (and associated data) can be migrated from the off-premises data center to the on-premises data center (e.g., from running as customer workloads 510B on colocation site 514 to running as customer workloads 510A on data center 508).

In some examples where the on-premises data center and off-premises data center are close enough, the storage (e.g., storage 516B) can be mirrored between the off-premises data center and the customer on-premises storage (e.g., storage 516A). In some examples, an availability zone failover can be triggered from the off-premises data center to the on-premises data center, such as described with respect to FIG. 7. In other examples, the customer workloads can gradually be moved over from the off-premises data center to the on-premises data center.

In some examples, "close enough" for data centers can refer to a measure of latency (which can be affected by geographical distance between data centers). Mirroring can be a synchronous paradigm that is sensitive to latency. The farther apart locations are, the higher latency can be, and at a threshold distance, the latency can be too high to mirror between data centers, based either on the customer workload or the equipment used for the mirroring.

In some examples, mirroring is limited to data centers that are at most 200-300 miles apart. There can be a latency associated with accessing a storage system. It can take approximately 1 millisecond for data to travel 200 miles. It can be that mirroring requires a latency of no more than 5 milliseconds (which can be a combination of latency associated with distance, equipment, and protocols used). Some protocols can require a full round trip (e.g., send the data and receive an acknowledgement), which can indicate that a 200 mile distance can involve a 2 millisecond latency, factoring in the acknowledgment.

In some examples, gradually moving a workload can comprise using load balancing and affinity techniques to transfer workloads between data centers. Where storage is mirrored between data centers, workloads can be migrated non-disruptively when ready. In such examples, parts of a workload at a time can be migrated, in contrast to an availability zone-type failover where all workloads are migrated.

Where mirroring is not implemented, a backup-restore migration can be implemented, where data from one data center is backed up and then restored to a different, destination data center. This approach can be disruptive because a workload can be taken down at the origin data center some point in the process, then the backup transferred and restored at the target, then the workload is brought up at the destination. Replication systems and other techniques can be implemented to minimize a disruption associated with backup-restore migration. In some examples, a backup-restore migration can be implemented at a time where disruption is predicted to have a minimal impact to a customer (e.g., late at night, or during a weekend).

Figure 6:
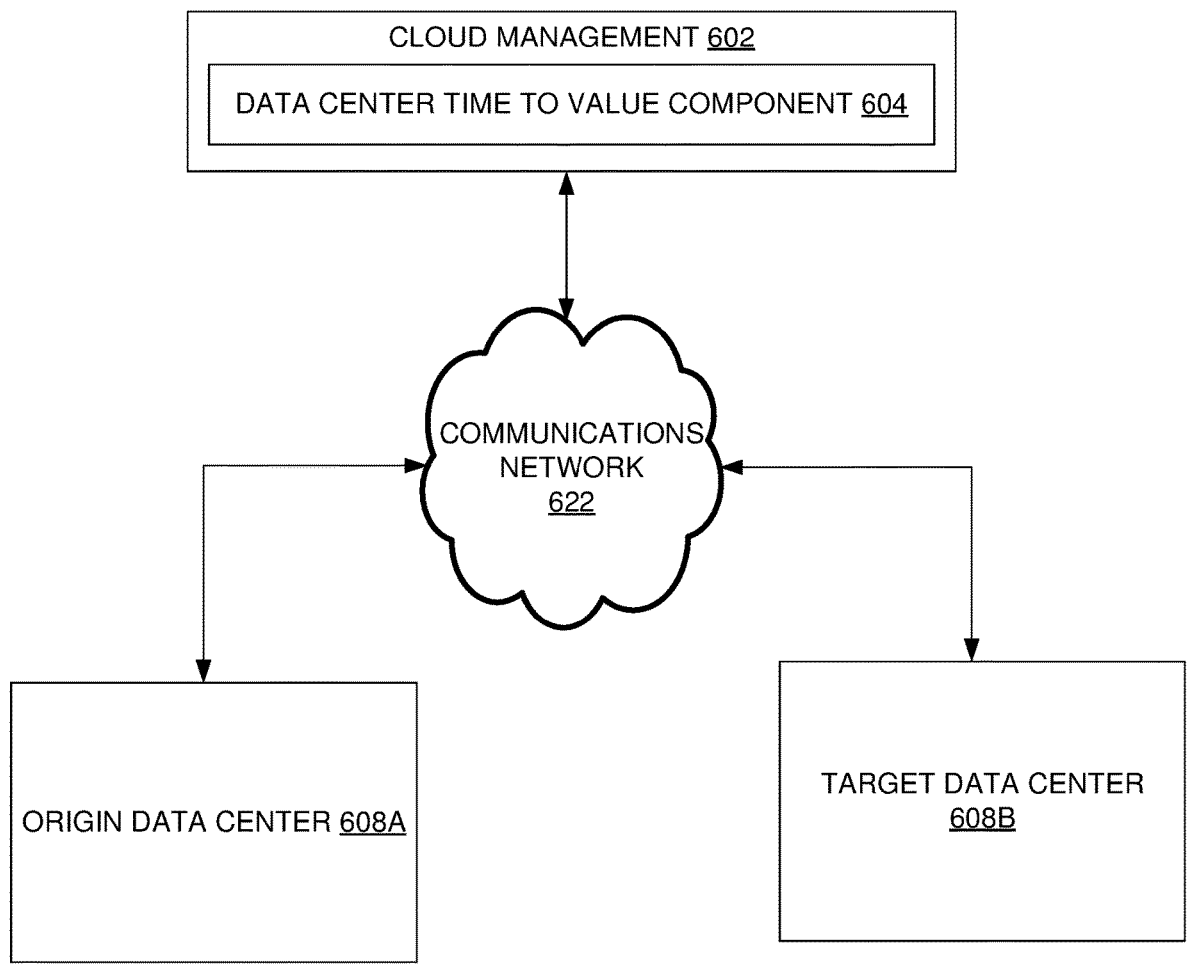
FIG. 6 illustrates an example system architecture for migrating to a data center, and that can facilitate data center time to value, in accordance with an embodiment of this disclosure.

In other examples, a data center migration can be performed, from the off-premises data center and to the on-premises data center, such as described with respect to FIG. 6.

In some examples, after the customer workloads are moved to the on-premises data center, the off-premises data center can be removed. In other examples, after the customer workloads are moved to the on-premises data center, the off-premises data center can be kept as a secondary availability zone (relative to the on-premises data center serving as a primary availability zone), where latencies allow.

Cloud management 502 can manage configuration of both data centers (e.g., data center 508 and colocation site 514), mirroring data and workloads between the two data centers, and a failover transition between the two data centers.

In some examples, an amount of hardware resources for the customer's on premises data center can be modified by measuring how customer workloads run on the off-premises data center. That is, the order can specify an amount of hardware resources that are a guess of how much resources are needed to run the customer workloads (or omit specifying an amount of resources). In actually running customer workloads on a hosted data center while instantiating the on premises data center, the amount of processing resources used in running the customer workloads can be measured. In some examples, the hardware resources for the customer order can be set, or modified, so that they are equal to an amount of resources used to run the customer workloads on the hosted data center, along with an additional amount of resources to handle expansion, or spikes in workloads.

FIG. 6 illustrates an example system architecture 600 for migrating to a data center, and that can facilitate data center time to value, in accordance with an embodiment of this disclosure.

System architecture 600 comprises cloud management 602 (which can be similar to cloud management 102 of FIG. 1), origin data center 608A and target data center 608B (which can each be similar to data center 108), and communications network 622 (which can be similar to communications network 122). In turn, cloud management 602 comprises restoration and migration component 604 (which can be similar to restoration and migration component 104).

In an IaaSaaS scenario, where a provider (e.g., cloud management 602) orchestrates full data centers, the provider can facilitate a full data center migration (e.g., from origin data center 608A and to target data center 608B) with little-to-no customer involvement. In some examples, migration can be performed with backup and restore constructs.

In some examples, a full migration can be effectuated as follows. Backup the data center (e.g., origin data center 608A) or use an existing backup (e.g., a latest backup). Restore the backup to a new location (e.g., target data center 608B). In some examples, the provider can orchestrate the infrastructure similar to as described with respect to system architecture 400 of FIG. 4 or system architecture 500 of FIG. 5. In some examples, a network bubble is not created, and Re-IP is not implemented, and workloads are not powered up.

In some examples, restoring the backup to a new location can take time to complete. To mitigate against data changes that occur during this time, another diff backup (e.g., a diff backup of origin data center 608A that reflects data changed on origin data center 608A since a previous backup was taken) can be taken during the restore, and changes in the diff can be applied to the new target site. Power down (or disconnect from a network) the origin site, and power up the new target site. In some examples, this can involve routing changes, based on network topology.

In some examples, powering up the target site before the origin site is disconnected or down can cause IP collisions.

In some examples, the provider has full control of the process, and therefore can facilitate migration without customer intervention. Where a switchover can be disruptive, a final switchover can be coordinated with the customer to occur at a preferred time. In some examples, the network on the target side can be temporarily isolated in order to test the site before performing the switchover, and handling any issues that are uncovered by running the isolated target side.

In some examples, origin data center 608A can be the customer data center operating as part of colocation site 514 of FIG. 5, and target data center 608B can be data center 508 (the customer's on-premises data center). That is, when the customer's on-premises data center is installed and ready to run customer workloads, a migration such as described with respect to FIG. 6 can be performed to migrate data (including customer workloads) from colocation site 514 (e.g., origin data center 608A) to data center 508 (e.g., target data center 608B).

Figure 7:
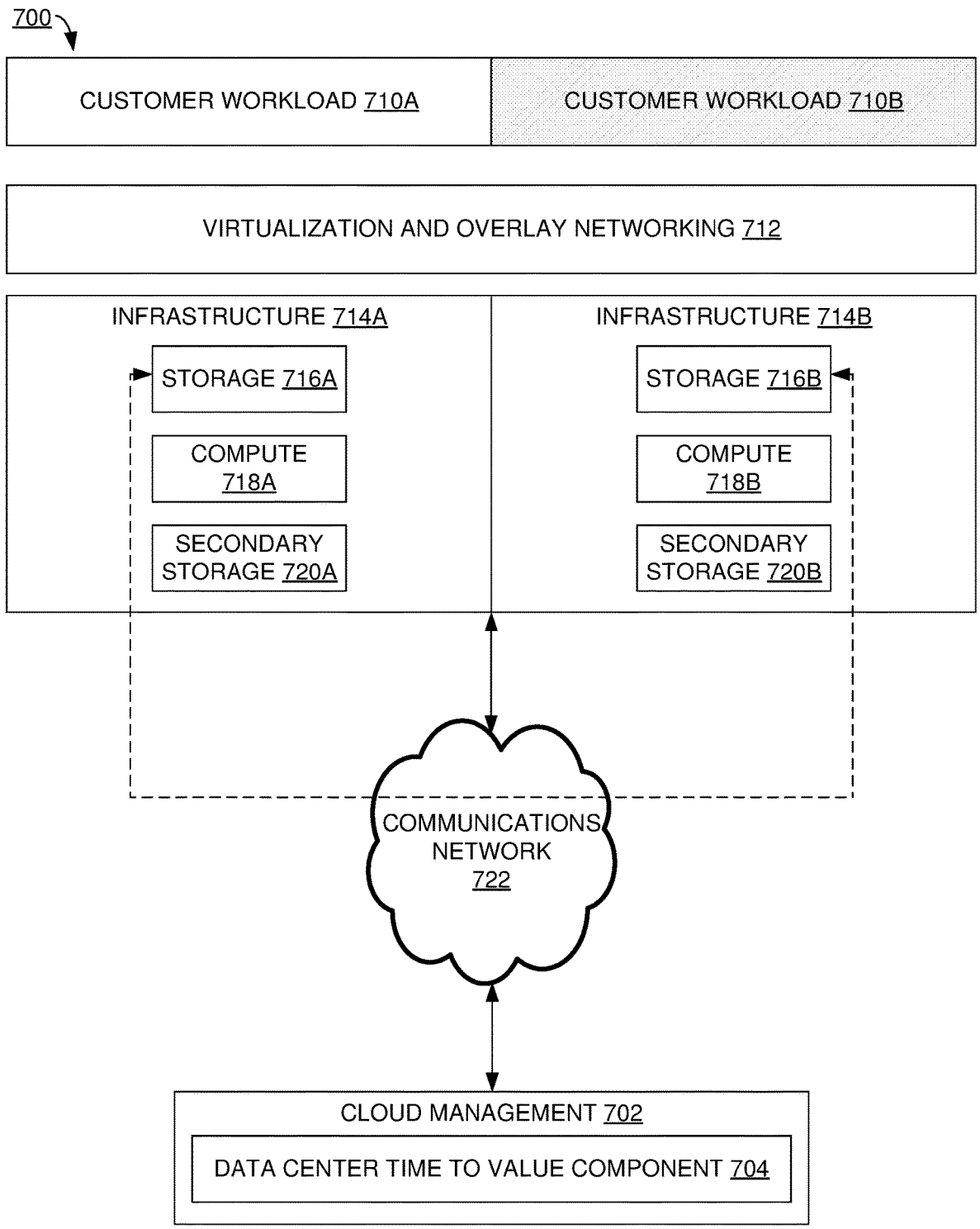
FIG. 7 illustrates an example system architecture for failing over between availability zones, and that can facilitate data center time to value, in accordance with an embodiment of this disclosure.

FIG. 7 illustrates another example system architecture 700 for failing over between availability zones, and that can facilitate data center time to value, in accordance with an embodiment of this disclosure.

System architecture 700 comprises cloud management 702 (which can be similar to cloud management 102 of FIG. 1), infrastructure 714A and infrastructure 714B (which can each be similar to infrastructure 114), virtualization and overlay networking 712 (which can be similar to virtualization and overlay networking 112), customer workload 710A and customer workload 710B (which can each be similar to customer workload 110), and communications network 722 (which can be similar to communications network 122).

In turn, cloud management 702 comprises restoration and migration component 704 (which can be similar to restoration and migration component 104). Infrastructure 714A comprises storage 716A, compute 718A, and secondary storage 720A (which can be similar to storage 116, compute 118, and secondary storage 120, respectively). Infrastructure 714B comprises storage 716B, compute 718B, and secondary storage 720B (which can be similar to storage 116, compute 118, and secondary storage 120, respectively).

Storage 716A and storage 716B can be configured in a mirroring configuration, where writes written to one storage are immediately and inline mirrored to the other. This configuration can mean that data in storage 716A and storage 716B can be identical (or mirrored). In some examples, technologies such as redundant array of inexpensive disks (RAID) 1, synchronous storage replicas, distributed storage volumes, synchronous clones, and active-active storage volumes can be used to implement mirroring between storage 716A and storage 716B.

As depicted, infrastructure 714A depicts an active availability zone that is executing customer workload 710A. Then, infrastructure 714B comprises a standby availability zone that is configured to execute customer workload 710B, but is not currently doing so. Where there is a failover (or otherwise a switch between availability zones), infrastructure 714B can begin executing customer workload 710B, while infrastructure 714A stops executing customer workload 710A. An availability zone can generally comprise a separate physical location (relative to a paired availability zone), with its own power and networking, so that should these resources fail for one availability zone, they can still be available at another availability zone.

An IaaSaaS offering can comprise a functionality to automatically create availability zones as a service (AZaaS). Availability zones can comprise (near) twin active/passive data centers that have data mirrored between them in real time. In a case of a service disruption in a main zone (e.g., infrastructure 714A), workloads can startup on the other availability zone (e.g., infrastructure 714B) and continue with little disruption.

An availability zone can be in a provider location, a third-party hosted location, or on another customer premise. In some examples, availability zones are within a low-latency distance of each other so that mirroring their data between the locations does not incur too high a latency.

In some examples, data is mirrored on both availability zone locations. Therefore, storage volume IDs can be identical in both locations. The network can comprise a stretched Layer 2 network, together with the overlay networking. A virtualization layer (e.g., virtualization and overlay networking 712) can span both locations, so that workloads (e.g., customer workload 710A and customer workload 710B) can shift from zone to zone without being configured to operate on the new zone.

Activation of an availability zone can be done by a high availability mechanism that powers up a workload at a correct location, and is managed by the provider. In some examples, a high availability mechanism can kick in regardless of cloud connectivity—e.g., using an on-premises orchestrator and independently of a provider's cloud.

In some examples, workloads run on one site (e.g., customer workload 710A on infrastructure 714A), which can allow costs associated with the other site to be reduced (when no workload is running).

Where the availability zone is in a hosting, provider, or shared location, and where adding compute to the cluster can be done quickly, resources can be shared (or over-provisioned) between customers to improve a cost ratio. In some examples, storage is not shared because the data is populated and mirrored live. In some examples, compute can mostly be powered down, and possibly shared between customers.

In some examples, infrastructure 714A can be the customer data center operating as part of colocation site 514 of FIG. 5, and infrastructure 714B can be data center 508 (the customer's on-premises data center). That is, when the customer's on-premises data center is installed and ready to run customer workloads, an availability zone failover such as described with respect to FIG. 7 can be performed to switch from operating customer workloads on colocation site 514 (e.g., infrastructure 714A) to data center 508 (e.g., infrastructure 714B).

Example Process Flows

Figure 8:
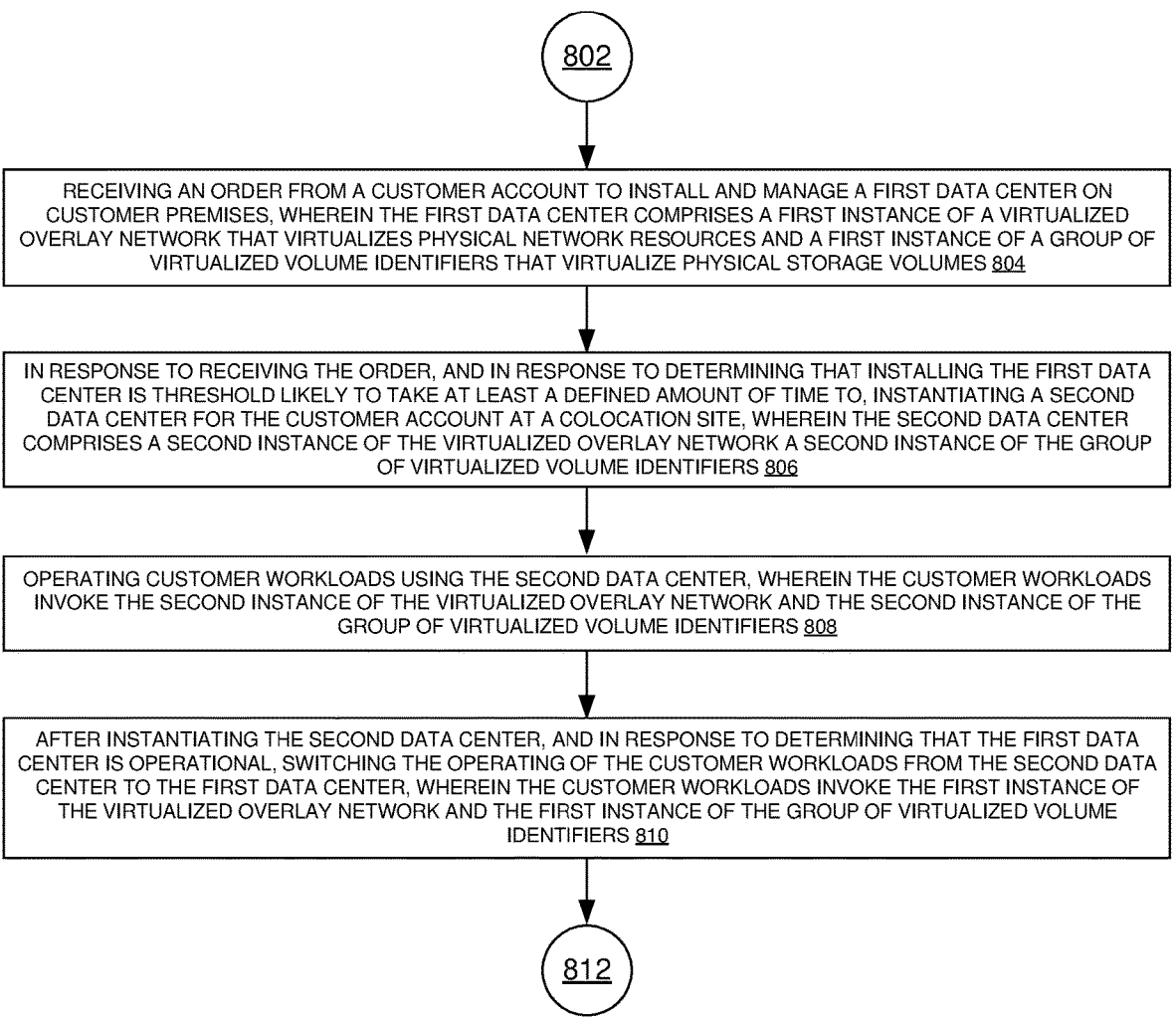
FIG. 8 illustrates an example process flow for data center time to value, in accordance with an embodiment of this disclosure.

FIG. 8 illustrates an example process flow 800 for data center time to value, in accordance with an embodiment of this disclosure. In some examples, one or more embodiments of process flow 800 can be implemented by data center time to value component 104 of FIG. 1, data center time to value component 204 of FIG. 2, data center time to value component 504 of FIG. 5, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804. Operation 804 depicts receiving an order from a customer account to install and manage a first data center on customer premises, wherein the first data center comprises a first instance of a virtualized overlay network that virtualizes physical network resources and a first instance of a group of virtualized volume identifiers that virtualize physical storage volumes. In some examples, this data center is data center 508 of FIG. 5, which the customer account orders to be installed, but is not yet installed.

After operation 804, process flow 800 moves to operation 806.

Operation 806 depicts, in response to receiving the order, and in response to determining that installing the first data center is threshold likely to take at least a defined amount of time to install, instantiating a second data center for the customer account at a colocation site, wherein the second data center comprises a second instance of the virtualized overlay network a second instance of the group of virtualized volume identifiers. The colocation site can be colocation site 514 of FIG. 5. In some examples, colocation site 514 can begin operating customer workloads faster than data center 508 (since data center 508 needs to be set up, such as by shipping hardware to the physical location of data center 508, or configuring the hardware). In some examples, where it is determined that it will take at least a threshold amount of time (e.g., two weeks) to get data center 508 running, colocation site 514 can be configured to operate customer workloads until data center 508 is running.

In some examples, the first and second instances of the group of virtualized volume identifiers can provide the same virtualized volume identifiers to a workload. That is, while the underlying physical volumes (and physical volume identifiers) can vary between data centers, the virtualized volume identifiers can remain the same, so workloads can be migrated between data centers without being modified to address different physical volumes.

In some examples, there is a service commitment with the customer account on how fast it will be between the time of the order and when customer workloads are running Where it is determined that this commitment will not be met through running customer workloads on data center 508, customer workloads can be run on colocation site 514 until data center 508 is ready.

In some examples, operation 806 comprises, in response to determining a type of storage associated with the first data center, using the type of storage with the second data center. In some examples, operation 806 comprises in response to determining a first type of storage associated with the first data center, using a second type of storage with the second data center, wherein the second type of storage is different than and compatible with the first type of storage. That is, the colocation site can run customer workloads using the same (or compatible) storage as the storage that is targeted for the data center.

After operation 806, process flow 800 moves to operation 808.

Operation 808 depicts operating customer workloads using the second data center, wherein the customer workloads invoke the second instance of the virtualized overlay network and the second instance of the group of virtualized volume identifiers. In some examples, the customer workloads can be customer workloads 510B, running on colocation site 514 via virtualization and overlay networking 512.

After operation 808, process flow 800 moves to operation 810.

Operation 810 depicts after instantiating the second data center, and in response to determining that the first data center is operational, switching the operating of the customer workloads from the second data center to the first data center, wherein the customer workloads invoke the first instance of the virtualized overlay network and the first instance of the group of virtualized volume identifiers. In some examples, when data center 508 of FIG. 5 is ready to run customer workloads, customer workloads can be shifted from running on colocation site 514 to running on data center 508. For example, customer workloads 510B can operate on colocation site 514. Then, those customer workloads can be shifted to run on data center 508, in the form of customer workloads 510A (which can be a different instance of customer workloads 510B than customer workloads 510B).

In some examples, operation 810 comprises in response to determining that the first data center is configured to store data, mirroring storage of the second data center to storage of the first data center. In some examples, operation 810 comprises mirroring the storage of the second data center to storage of the first data center in response to determining that a distance between the first data center and the second data center is below a defined threshold value. That is, in some examples where the first data center and the second data center are close, data can be transferred from the second data center and to the first data center via a mirroring operation.

In some examples, operation 810 comprises in response to determining that the first data center is operational, triggering an availability zone failover from the second data center to the first data center. That is, the first data center and the second data center can operate as availability zones, similar to as in system architecture 700 of FIG. 7. In such examples, workloads can be shifted from the second data center to the first data center by triggering a failover where the first data center becomes the primary data center in the availability zone, and the second data center becomes the standby data center in the availability zone.

In some examples, operation 810 comprises, in response to determining that the first data center is operational, iteratively switching the operating of the customer workloads from the second data center to the first data center. That is, once the first data center is operational, customer workloads can be shifted from the second data center to the first data center over time (such as when they are not actively operating on data). During this period of shifting, it can be that some customer workloads are operating on the second data center, and some customer workloads are operating on the first data center.

In some examples, operation 810 comprises in response to determining that the first data center is operational, disconnecting the second data center from a public communications network before performing the switching the operating of the customer workloads from the second data center to the first data center. That is, a migration can be performed, similar as described with respect to FIG. 6.

After operation 810, process flow 800 moves to 812, where process flow 800 ends.

FIG. 9 illustrates another example process flow 900 for data center time to value, in accordance with an embodiment of this disclosure. In some examples, one or more embodiments of process flow 900 can be implemented by data center time to value component 104 of FIG. 1, data center time to value component 204 of FIG. 2, data center time to value component 504 of FIG. 5, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904. Operation 904 depicts receiving order data representative of an order from a customer account to install and manage a first data center at a first physical location, wherein the first data center comprises a first instance of a virtualized overlay network that abstracts physical network resources and a first instance of a group of virtualized volume identifiers that abstract physical storage volumes. In some examples, operation 904 can be implemented in a similar manner as operation 804 of FIG. 8.

After operation 904, process flow 900 moves to operation 906.

Operation 906 depicts, in response to receiving the order data, and in response to determining that there will be at least a threshold delay associated with installing the first data center, instantiating a second data center for the customer account at second physical location, wherein the second data center comprises a second instance of the virtualized overlay network a second instance of the group of virtualized volume identifiers. In some examples, operation 906 can be implemented in a similar manner as operation 806 of FIG. 8.

After operation 906, process flow 900 moves to operation 908.

Operation 908 depicts operating customer workloads using the second data center, wherein the customer workloads invoke the second instance of the virtualized overlay network and the second instance of the group of virtualized volume identifiers. In some examples, operation 908 can be implemented in a similar manner as operation 808 of FIG. 8.

In some examples, operation 908 comprises determining a first amount of resources to install for the first data center based on determining a second amount of resources associated with operating the customer workloads using the second data center. That is, determining how much hardware resources to include in the first data center can be determined based on actually running the customer workloads on the second data center and determining how much hardware resources running the customer workloads actually takes. In some examples, the order specifies an amount of hardware resources, and this amount is modified. In other examples, the order does not specify the amount of hardware resources.

In some examples, the order identifies a first amount of computing resources, operation 908 comprises, in response to determining that the customer workloads being processed using the second data center consume a second amount of computing resources, and in response to determining that the first amount of computing resources differs from the second amount of computing resources by at least a specified amount, modifying an amount of computing resources associated with the order. That is, in some examples, the customer can specify an amount of hardware resources in the order, and this amount can be refined based on running the customer workloads at the second data center.

In some examples, the second amount of computing resources is greater than the first amount of computing resources, and wherein modifying the amount of computing resources associated with the order comprises increasing the amount of computing resources associated with the order. That is, where it turns out that the customer needs more hardware resources than ordered, then the amount of hardware resources for the first data center can be increased.

In some examples, the second amount of computing resources is less than the first amount of computing resources, and wherein modifying the amount of computing resources associated with the order comprises decreasing the amount of computing resources associated with the order. That is, where it turns out that the customer needs less hardware resources than ordered, then the amount of hardware resources for the first data center can be decreased.

After operation 908, process flow 900 moves to operation 910.

Operation 910 depicts, after instantiating the second data center, and in response to determining that the first data center is operational, switching the operating of the customer workloads from the second data center to the first data center, wherein the customer workloads invoke the first instance of the virtualized overlay network and the first instance of the group of virtualized volume identifiers. In some examples, operation 910 can be implemented in a similar manner as operation 810 of FIG. 8.

In some examples, a cloud management platform manages the first data center and the second data center, and controls the switching of the operating of the customer workloads from the second data center to the first data center. The cloud management platform can be cloud management 502 of FIG. 5.

After operation 904, process flow 900 moves to 912, where process flow 900 ends.

Figure 10:
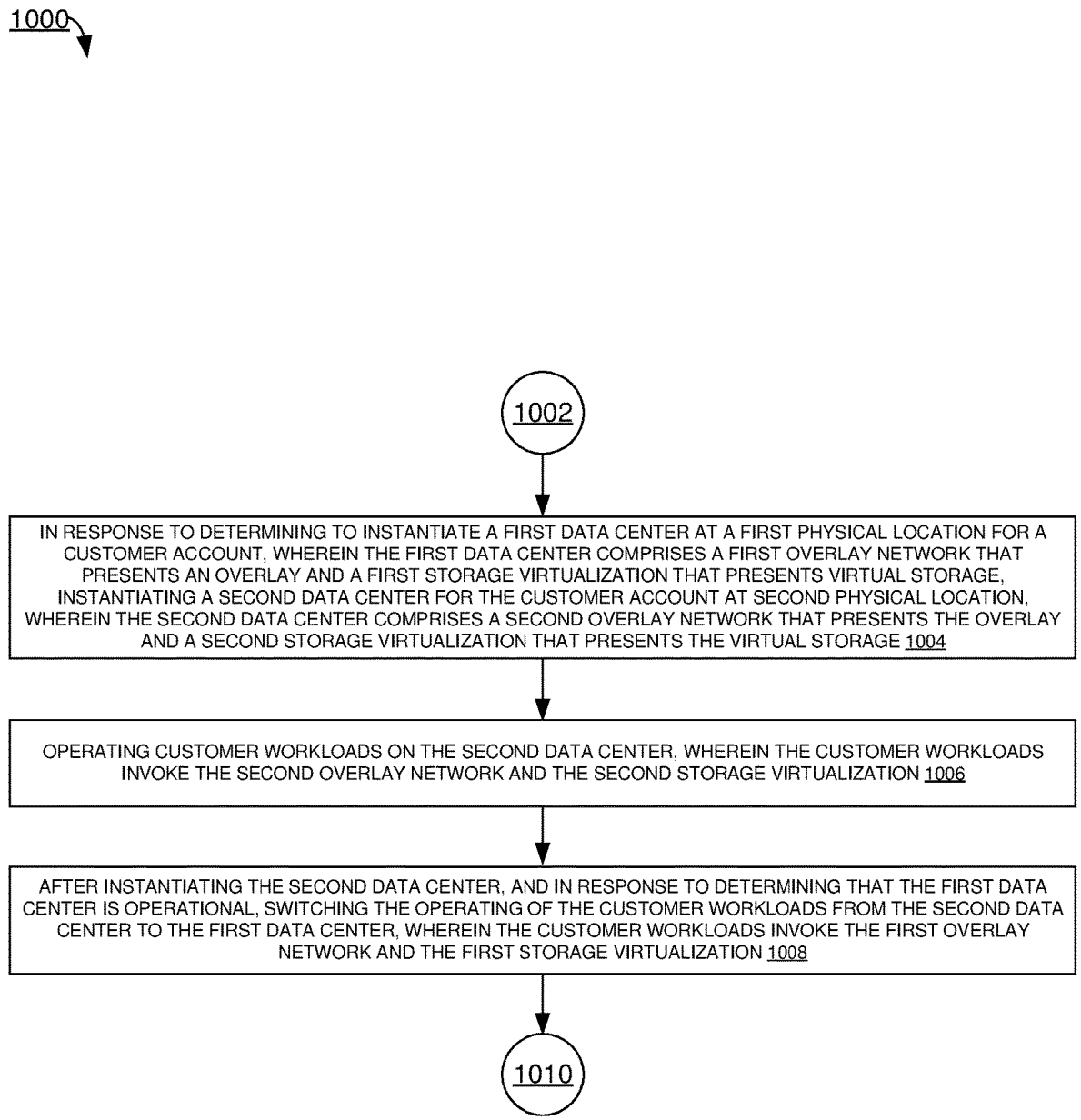
FIG. 10 illustrates another example process flow for data center time to value, in accordance with an embodiment of this disclosure.

FIG. 10 illustrates another example process flow 1000 for data center time to value, in accordance with an embodiment of this disclosure. In some examples, one or more embodiments of process flow 1000 can be implemented by data center time to value component 104 of FIG. 1, data center time to value component 204 of FIG. 2, data center time to value component 504 of FIG. 5, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004. Operation 1004 depicts, in response to determining to instantiate a first data center at a first physical location for a customer account, wherein the first data center comprises a first overlay network that presents an overlay and a first storage virtualization that presents virtual storage, instantiating a second data center for the customer account at second physical location, wherein the second data center comprises a second overlay network that presents the overlay and a second storage virtualization that presents the virtual storage. In some examples, operation 1004 can be implemented in a similar manner as operations 804-806 of FIG. 8.

In some example, the overlay comprises a first instance of virtualizing first physical network resources on the first data center, wherein the overlay comprises a second instance of virtualizing second physical network resources of the second data center, and wherein a same invocation of the overlay by the customer workloads on the first data center and the second data center, respectively, accesses different physical network resources on the first data center and the second data center. That is, the overlay can be the overlay network portion of virtualization and overlay networking 512 of FIG. 5.

In some examples, the virtual storage comprises a first instance of virtualizing first physical storage resources on the first data center, wherein the overlay comprises a second instance of virtualizing second physical storage resources of the second data center, and wherein a same invocation of the virtual storage by the customer workloads on the first data center and the second data center, respectively, accesses different physical storage resources on the first data center and the second data center. That is, the virtual storage can be a virtual storage portion of virtualization and overlay networking 512 of FIG. 5.

After operation 1004, process flow 1000 moves to operation 1006.

Operation 1006 depicts operating customer workloads on the second data center, wherein the customer workloads invoke the second overlay network and the second storage virtualization. In some examples, operation 1006 can be implemented in a similar manner as operation 808 of FIG. 8.

After operation 1006, process flow 1000 moves to operation 1008.

Operation 1008 depicts after instantiating the second data center, and in response to determining that the first data center is operational, switching the operating of the customer workloads from the second data center to the first data center, wherein the customer workloads invoke the first overlay network and the first storage virtualization. In some examples, operation 1008 can be implemented in a similar manner as operation 810 of FIG. 8.

In some examples, operation 1008 comprises, after switching the operating of the customer workloads from the second data center to the first data center, decommissioning the second data center. That is, after setting up the first data center and running the customer workloads on it, the second data center can be removed.

In some examples, operation 1008 comprises, after switching the operating of the customer workloads from the second data center to the first data center, configuring the first data center as a primary availability zone and the second data center as a secondary availability zone. In some examples, operation 1008 comprises determining to configure the second data center as the secondary availability zone based on determining that a latency between the first data center and the second data center is below a predetermined threshold value. That is, in some examples, after establishing the first data center and moving customer workloads to the first data center, the second data center can be kept as an availability zone (a standby data center relative to the first data center being the primary data center), where latencies permit such operation. Where availability zones mirror data, there can be a maximum latency in data transfer between the two availability zones to facilitate this mirroring (e.g., there can be a physical distance limit of 200-300 miles between the two data centers, as described in an example with respect to mirroring).

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of cloud management 102, data centers 106, and/or data center 108 of FIG. 1, and/or cloud management 202, data centers 206, and/or data center 208 of FIG. 2.

In some examples, computing environment 1100 can implement one or more embodiments of the process flows of FIGS. 8-10 to facilitate data center time to value.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving an order from a customer account to install and manage a first data center on customer premises, wherein the first data center comprises a first instance of a virtualized overlay network that virtualizes physical network resources and a first instance of a group of virtualized volume identifiers that virtualize physical storage volumes;
        in response to receiving the order, and in response to determining that installing the first data center is threshold likely to take at least a defined amount of time to install, instantiating a second data center for the customer account at a colocation site, wherein the second data center comprises a second instance of the virtualized overlay network a second instance of the group of virtualized volume identifiers;
        operating customer workloads using the second data center, wherein the customer workloads invoke the second instance of the virtualized overlay network and the second instance of the group of virtualized volume identifiers; and
        after instantiating the second data center, and in response to determining that the first data center is operational, switching the operating of the customer workloads from the second data center to the first data center, wherein the customer workloads invoke the first instance of the virtualized overlay network and the first instance of the group of virtualized volume identifiers.

2. The system of claim 1, wherein the operations further comprise:
    in response to determining a type of storage associated with the first data center, using the type of storage with the second data center.

3. The system of claim 1, wherein the operations further comprise:
    in response to determining a first type of storage associated with the first data center, using a second type of storage with the second data center, wherein the second type of storage exceeds a performance metric of the first type of storage.

4. The system of claim 1, wherein the operations further comprise:
    in response to determining that the first data center is configured to store data, mirroring storage of the second data center to storage of the first data center.

5. The system of claim 4, wherein the operations further comprise:
    mirroring the storage of the second data center to storage of the first data center in response to determining that a latency of data transfer between the first data center and the second data center is below a defined threshold value.

6. The system of claim 1, wherein the operations further comprise:
    in response to determining that the first data center is operational, triggering an availability zone failover from the second data center to the first data center.

7. The system of claim 1, wherein the operations further comprise:
    in response to determining that the first data center is operational, iteratively switching the operating of the customer workloads from the second data center to the first data center.

8. The system of claim 1, wherein the operations further comprise:
    in response to determining that the first data center is operational, disconnecting the second data center from a public communications network before performing the switching the operating of the customer workloads from the second data center to the first data center.

9. A method, comprising:
receiving, by a system comprising a processor, order data representative of an order from a customer account to install and manage a first data center at a first physical location, wherein the first data center comprises a first instance of a virtualized overlay network that abstracts physical network resources and a first instance of a group of virtualized volume identifiers that abstract physical storage volumes;
in response to receiving the order data, and in response to determining that there will be at least a threshold delay associated with installing the first data center, instantiating, by the system, a second data center for the customer account at second physical location, wherein the second data center comprises a second instance of the virtualized overlay network a second instance of the group of virtualized volume identifiers;
operating, by the system, customer workloads using the second data center, wherein the customer workloads invoke the second instance of the virtualized overlay network and the second instance of the group of virtualized volume identifiers; and
after instantiating the second data center, and in response to determining that the first data center is operational, switching, by the system, the operating of the customer workloads from the second data center to the first data center, wherein the customer workloads invoke the first instance of the virtualized overlay network and the first instance of the group of virtualized volume identifiers.

10. The method of claim 9, wherein the system comprises a cloud management platform that manages the first data center and the second data center, and that controls the switching of the operating of the customer workloads from the second data center to the first data center.

11. The method of claim 9, further comprising:
determining, by the system, a first amount of resources to install for the first data center based on determining a second amount of resources associated with operating the customer workloads using the second data center.

12. The method of claim 10, wherein the order identifies a first amount of computing resources, and further comprises:
in response to determining, by the system, that the customer workloads being processed using the second data center consume a second amount of computing resources, and in response to determining that the first amount of computing resources differs from the second amount of computing resources by at least a specified amount, modifying an amount of computing resources associated with the order.

13. The method of claim 12, wherein the second amount of computing resources is greater than the first amount of computing resources, and wherein modifying the amount of computing resources associated with the order comprises increasing the amount of computing resources associated with the order.

14. The method of claim 12, wherein the second amount of computing resources is less than the first amount of computing resources, and wherein modifying the amount of computing resources associated with the order comprises decreasing the amount of computing resources associated with the order.

15. A non-transitory computer-readable medium comprising instructions that, in response to execution, cause a system comprising a processor to perform operations, comprising:
in response to determining to instantiate a first data center at a first physical location for a customer account, wherein the first data center comprises a first overlay network that presents an overlay and a first storage virtualization that presents virtual storage, instantiating a second data center for the customer account at second physical location, wherein the second data center comprises a second overlay network that presents the overlay and a second storage virtualization that presents the virtual storage;
operating customer workloads on the second data center, wherein the customer workloads invoke the second overlay network and the second storage virtualization; and
after instantiating the second data center, and in response to determining that the first data center is operational, switching the operating of the customer workloads from the second data center to the first data center, wherein the customer workloads invoke the first overlay network and the first storage virtualization.

16. The non-transitory computer-readable medium of claim 15, wherein the operations further comprise:
after switching the operating of the customer workloads from the second data center to the first data center, decommissioning the second data center.

17. The non-transitory computer-readable medium of claim 15, wherein the operations further comprise:
after switching the operating of the customer workloads from the second data center to the first data center, configuring the first data center as a primary availability zone and the second data center as a secondary availability zone.

18. The non-transitory computer-readable medium of claim 17, wherein the operations further comprise:
determining, by the system, to configure the second data center as the secondary availability zone based on determining that a latency between the first data center and the second data center is below a predetermined threshold value.

19. The non-transitory computer-readable medium of claim 15, wherein the overlay comprises a first instance of virtualizing first physical network resources on the first data center, wherein the overlay comprises a second instance of virtualizing second physical network resources of the second data center, and wherein a same invocation of the overlay by the customer workloads on the first data center and the second data center, respectively, accesses different physical network resources on the first data center and the second data center.

20. The non-transitory computer-readable medium of claim 15, wherein the virtual storage comprises a first instance of virtualizing first physical storage resources on the first data center, wherein the overlay comprises a second instance of virtualizing second physical storage resources of the second data center, and wherein a same invocation of the virtual storage by the customer workloads on the first data center and the second data center, respectively, accesses different physical storage resources on the first data center and the second data center.

* * * * *